United States Patent Office 3,188,335
Patented June 8, 1965

3,188,335
ORGANO-METALLO-CARBONYL COMPLEXES PREPARED BY THE REACTION OF ACETYLENE WITH A METAL CARBONYL
Karl W. Hubel, Brussels, Belgium, assignor to Union Carbide Company, a corporation of New York
No Drawing. Filed Aug. 24, 1962, Ser. No. 219,102
Claims priority, application Great Britain, Jan. 18, 1957, 1,857/57; May 16, 1957, 15,526/57; Oct. 25, 1957, 33,330/57
29 Claims. (Cl. 260—439)

The present invention relates to organo-metallo-carbonyl complexes and to their preparation. More particularly, the invention relates to organo-metallo-carbonyl complexes comprising a transition metal of the sixth, seventh, and eighth groups of the periodic table and pi-bonded to the metal a ring having at least five members.

The synthesis of larger organic molecules from smaller organic molecules is very important in modern technology since these larger molecules provide bases for new and better polymers, solvents, catalysts, and the like and provide bases for forming a continuum of new compounds. Of special importance are those compounds which are stable at ordinary temperatures but which decompose at higher temperatures. Such compounds frequently yield novel cyclic compounds upon decomposition as well as active radicals useful in the synthesis of other compounds. The active radicals may combine with themselves or with other radicals to form the new final product desired, or may perform other functions such as the promotion of polymerization and crosslinking and the inhibition of depolymerization.

One of these syntheses is shown by Greenfield and Sternberg in J. Am. Chem. Soc. 76 (1954) 1457–8. They showed that when one mole of dicobalt octacarbonyl is reacted at room temperature with one mole of acetylene or a substituted acetylene, the two bridge carbonyls of the dicobalt octacarbonyl are substituted by one acetylene, leading to a metal-acetylene-carbonyl complex having an overall configuration of the carbonyl. This structure follows:

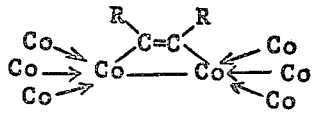

Subsequently, the same authors in J. Am. Chem. Soc., 77 (1955), 4946–7, described an iron complex made by reacting an alkaline solution of NaHFe(CO)$_4$ with acetylene at room temperature. By analogy with the Cobalt Complex, they assigned the following structure to this complex:

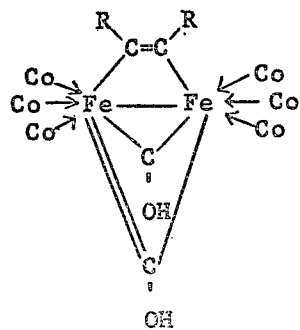

At a later date, however, Hock and Mills in Proc. Chem. Soc. (1958), 233, showed this analogous structure to be erroneous; hence, the extrapolation of the cobalt data of Greenfield and Sternberg to the iron complex, as they postulated, is untenable.

The substitution nature of the cobalt complex of Greenfield and Sternberg is demonstrated both by stoichiometric considerations and by the fact that the bridge acetylene ligand can be removed from the complex when the latter is subjected to further treatment, as discussed by Hock and Mills in the article referred to above.

The primary object of the invention, therefore, is to provide a new and useful group of organo-metallo-carbonyl complexes which are usually stable at normal temperatures and pressures.

Another object of the invention is to provide a process for making organo-metallo-carbonyl complexes having ring structures.

Another object of the invention is to provide new substances which are useful as catalysts and intermediates in the synthesis of cyclic organic compounds.

The present invention is based on the discovery that a metal carbonyl and an acetylene compound will react in a neutral, non-aqueous medium with an excess of the acetylenic compound, preferably at an elevated temperature, to form an organo-metallo-carbonyl complex containing a metal and a ring pi-bonded to the metal. In the reaction, a transformation of the starting materials occurs with the concomitant formation of a metal-acetylene-carbonyl complex containing at least one ring which is pi-bonded to at least one metal, usually of a metal carbonyl group. The ring is composed of at least four carbons, each of which is derived from an acetylenic carbon in the reactant, and at least one member chosen from carbonyl groups and the metal originally present in the carbonyl reactant. Each carbon atom in the ring deriving from the acetylenic reactant carries along the monovalent radical present in the acetylenic reactant, and any residual valences of the metals in the complex are satisfied by bonds with carbonyl groups and sometimes by bonds with other metals in the complex.

A typical example of the complexes of the invention is, for instance, 1,1,1-tricarbonyl-1-ferra-tetraphenylcyclopentadiene-pi-iron-tricarbonyl:

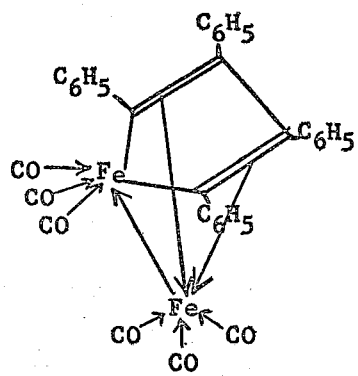

This compound is readily obtained when at least two moles of diphenylacetylene are reacted in petroleum ether at about 70° C., 90° C., or 150° C., with either iron enneacarbonyl, iron tetracarbonyl, or iron pentacarbonyl, respectively. The ring in this compound consists of four carbons deriving from the acetylenic carbon atoms in the diphenylacetylene and one iron atom of an iron tricarbonyl group. The ring is pi-bonded to another iron atom of an iron tricarbonyl group, and the electron requirements of the metals are satisfied by a metal to metal donating bond.

Particularly significant is the fact that the structure of the complex is not related to that of the initial metal carbonyl, and is not dependent on the presence of bridge carbonyls in the metal carbonyl reactant. Indeed, it is well known that the configurations of the three types of carbonyl reactants referred to above are not identical, and that, for instance, iron pentacarbonyl does not contain bridge carbonyls.

Although the mechanism of the complex formation is not yet fully understood, the facts reported above along with the structures of these complexes seem to indicate that the reaction proceeds through a coordination synthesis, i.e., the uptake of acetylenic ligands by highly reactive carbonyl fragments such as $Fe(CO)_3$, $Fe(CO)_2$, or $Fe(CO)$ which act as unstable electron acceptors. Regardless of the source or the nature of these carbonyl fragments, the evidence indicates that they react with an acetylenic linkage to form a usually unstable intermediate which combines or reacts with additional acetylenic linkages and/or carbon monoxide from the carbonyls to yield the stable complex compounds disclosed herein. A stable intermediate can be isolated in the case of dicobalt octacarbonyl and sometimes in the case of iron enneacarbonyl. In these cases, the intermediate is a substitution-type complex which will then react with another mole of alkyne leading to the complexes of the invention as illustrated below:

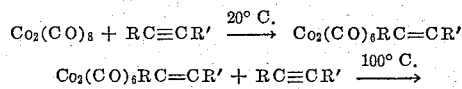

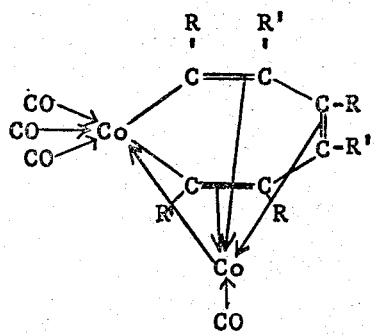

and

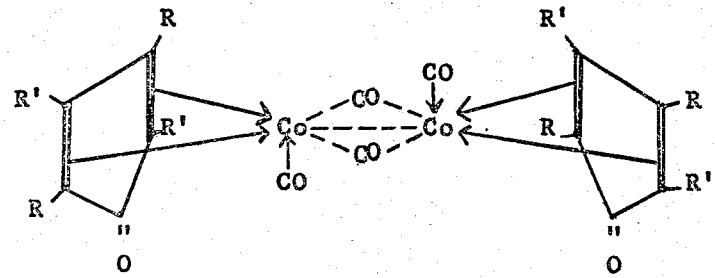

Thus, the present invention also includes the preparation of the novel complexes by the reaction of a stable substitution-type complex with at least one mole of an alkyne in an inert, non-aqueous solvent, preferably at an elevated temperature.

Broadly, the complexes of the invention comprise at least one transition metal of the sixth, seventh, and eighth groups of the periodic table and pi-bonded to the metal at least one ring consisting of between 5 and 16 members inclusive, which consist of an even number of carbons between 4 and 12 inclusive and at least one and not more than four carbonyls and/or metal atoms. Each of the carbons other than the carbonyl carbon is covalently bonded to a monovalent radical, and the residual valences of the metals in the complexes are satisfied by bonds with carbonyl groups or by bonds with each other. Furthermore, the ring may be monocyclic, bicyclic, or possibly polycyclic.

The nature of the so-called pi-bonds between organic groups and metal atoms is discussed in detail in the literature relating to organo-metallic compounds. Stated in non-technical terms, one or more pi-bonds are formed when a normally unsaturated organic compound forms a coordinate bond with a metal atom by means of electrons which contribute to the unsaturation in the unbonded organic compound. Although it is recognized that technically the interconnection between the organic group and the metal atom is preferably referred to as an organic group pi-bonded to a metal atom, and not as a metal atom pi-bonded to an organic group, the description and claims hereinafter will refer to the same interconnection in either manner as the circumstances dictate for conciseness and clarity.

The complexes of the invention may be defined empirically as organo-metallo-carbonyl complexes having the formula

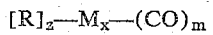

wherein M is a transition metal of the sixth, seventh, or eighth groups of the periodic table; $x$ is 1 or 2; CO is a carbonyl group; $m$ is the number of CO groups required to satisfy the residual valences of the metal M; R is a ring pi-bonded to the metal M, which ring consists of from 5 to 16 members consisting of an even number from 4 to 12 inclusive of carbon atoms having only a single covalent bond available after ring bonds, each of the carbon atoms being covalently bonded to a monovalent radical, and at least one and not more than four members selected from carbonyl groups and $Y(CO)_y$ groups wherein Y is a transition metal of the sixth, seventh, and eighth groups of the periodic table, CO is carbonyl, and $y$ is the number of CO groups required to satisfy the residual valences of Y; and $z$ is one or two. Representative compounds follow wherein $C_2$ represents carbon-to-carbon bonding, and R and R' represent monovalent radicals:

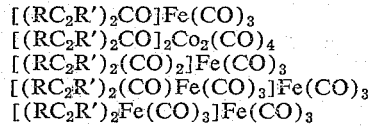

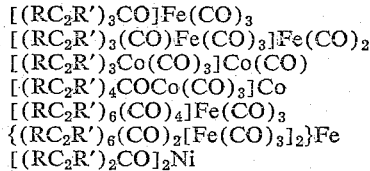

As discussed above, the complexes of the invention contain a ring having from 5 to 16 members; however, the preferred complexes contain a ring having from 5 to 8 members inclusive. In addition, the ring usually contains from 1 to 2 carbonyls or metal carbonyl groups, although rings having up to 4 of these groups as members fall within the scope of the invention. In the case of the complexes containing two separate rings, the complex as a whole is bonded together by a central pi-bonded metal atom or by two or more pi-bonded metal atoms which are in turn bonded to one another.

Several representative compounds will follow to illustrate specifically the complexes of the invention:

Tetraphenylcyclopentadienone-pi-iron-tricarbonyl

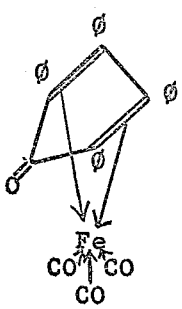

In such a compound, the pi-bonded metal atom, Fe, has a sufficient number of carbonyl groups coordinately bonded to it to satisfy the residual valency. Generically, the pi-bonded metal and the carbonyl groups attached thereto can be represented by $M(CO)_m$ wherein M is a metal atom and $m$ is an integer representing the number of residual valences of the metal atom.

Tetraphenyl-p-quinone-iron-tricarbonyl

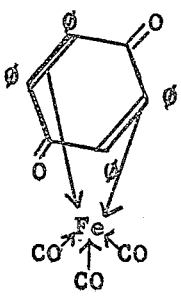

1,1,1-tricarbonyl-1-ferra-tetraphenylcyclohexa-2,5-dien-4-one-pi-iron-tricarbonyl

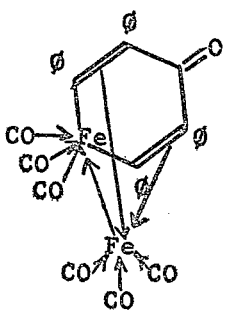

Generically, these two compounds may be represented by the formula

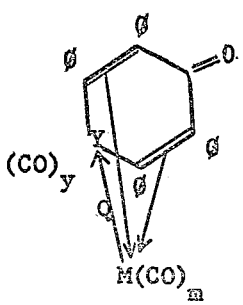

wherein M is a metal, Y is either a metal or a carbonyl, $m$ and $y$ are integers representing the number of residual valences of M and Y respectively, and Q represents a coordinate bond if there is any.

1,1,1-tricarbonyl-1-ferra-tetraphenylcyclopentadiene-pi-iron-tricarbonyl

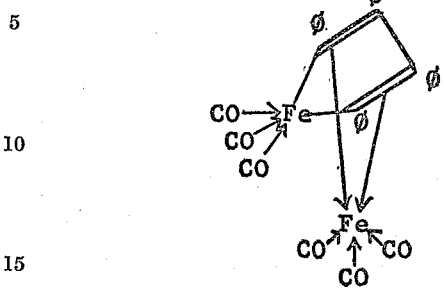

This type of compound along with the cyclopentadienone compounds can be generically represented in a manner similar to the two compounds immediately above.

2,4,6-triphenyltropone-iron-tricarbonyl

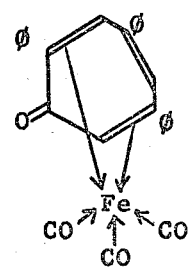

The ring carbonyl groups here may be replaced by a metal atom along with the required number of carbonyl groups, as in the above compounds.

1,1,1-tricarbonyl-3,6,8-triphenyl-1-ferra-bicyclo[3.3.0] octa-2,7-dien-4-one-pi-iron-dicarbonyl

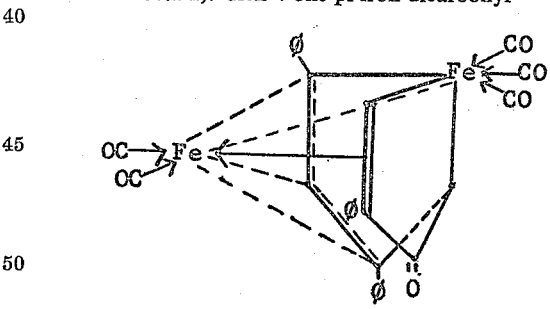

Bis(cyclopentadienone-cobalt-dicarbonyl)

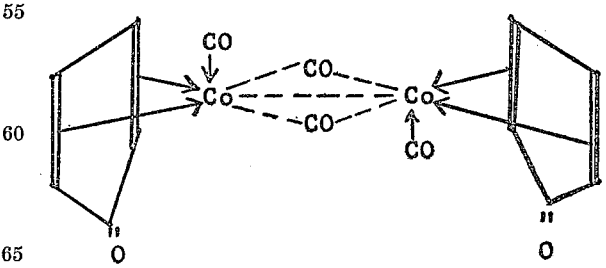

As one will note, the residual valences of the metal ring member, after the necessary ring bonds, are satisfied by either carbonyl groups, a bond with a pi-bonded metal, or a combination of the two. Similarly, the pi-bonded metal atoms are satisfied by either bonds with carbonyl groups, bonds with a metal ring member, bonds with another pi-bonded metal atom, or a combination of these bonds. In addition, bridging carbonyl groups oftentimes satisfy the valences of either the metal ring member, the pi-bonded metal atoms as shown in the formula first above, or both. The tropone compounds above should also be especially noted since not all the available pi-bonds are utilized by the metal atom in all cases. A carbonyl group may substitute for an available pi-bond, but in any case the metal must have at least one pi-bond.

As used herein, the term "periodic table" refers to the periodic table found on pages 394 and 395 of the "Handbook of Chemistry and Physics" (38th ed. 1956–1957). To illustrate some of the transition metals which may be found in the sixth, seventh, and eighth groups of this table, the elements chromium, manganese, rhenium, molybdenum, tungsten, iron, cobalt, ruthenium, osmium, rhodium, iridium, nickel, palladium, and platinum may be mentioned. The preferred metals include iron, cobalt, nickel, manganese, tungsten, molybdenum, chromium, and rhenium, with the latter two less preferred than the first six.

Each of the carbons in the ring other than a carbon in a carbonyl group must be bonded to a monovalent radical by a covalent bond. It was found that the size and the functional properties of these radicals are of substantially no importance in the complexes. The principal requirement of the radicals is merely that they satisfy the residual valence of the ring carbon atoms. The preferred radicals include hydrogen, alkyl, phenyl, halogen-substituted phenyl, halogeno, —COOZ wherein Z is a hydrogen or alkyl, hydride groups of silicon, arsenic, antimony, and phosphorus, such as silyl, arsino, stibino, phosphino, and their alkyl-substituted derivatives, alkenyl, alkynyl, and cycloaliphatic groups. It is also preferable if the radicals contain no more than 18 carbon atoms. Examples of such groups follow:

| methyl | bromo | methylstibino |
| ethyl | iodo | dinonylstibino |
| butyl | carboxyl | ethynyl |
| octyl | methoxycarbonyl | butynyl |
| dodecyl | butoxycarbonyl | phenylethynyl |
| hexadecyl | nonoxycarbonyl | ethenyl |
| octadecyl | silyl | butenyl |
| phenyl | methylsilyl | cyclohexyl |
| tolyl | trimethylsilyl | cyclobutyl |
| p-chlorophenyl | trihexylsilyl | octylcyclohexyl |
| p-bromophenyl | phosphino | cycloheptyl |
| p-iodophenyl | dimethylphosphino | cyclopentadienyl |
| biphenylyl | dioctylphosphino | cyclohexenyl |
| terphenylyl | stibino | cyclohexadienyl |
| dodecylphenyl | arsino | cyclopentenyl |
| chloro | dibutylstibino | |

Furthermore, the fact that the ring carbons derived from acetylene carry their monovalent radicals with them during the synthesis is especially important when one desires a certain substituted ring in the final complex. For this reason, the process of the invention when using mono- and disubstituted acetylenes as the reactant is especially important. Likewise, the preferred complexes of the invention are those which contain at least one monovalent radical other than hydrogen, i.e., a substituent, and in most instances are those which contain at least the number of monovalent radicals which corresponds to one-half of the number of ring carbons derived from acetylene.

The above novel complexes may be readily prepared by the process of the invention which comprises reacting in a molar ratio of 1 to at least 2 respectively a carbonyl of a transition metal with an alkyne in a neutral non-aqueous medium and at a temperature between about room temperature and about 300° C. whereat the complex of the invention is formed. At least two moles of alkyne per mole of carbonyl must be used in the reaction if the complexes of the invention are to be expected. The reason for this can be explained most easily by reference to the reaction mechanism described hereinbefore.

The alkynes suitable for the process of the invention have the general formula $R^1—C\equiv C—R^2$, wherein $R^1$ and $R^2$ are monovalent radicals. These radicals are the same as those discussed above in relation to the structure of the novel complexes, and since they are merely carried along during the coordination synthesis, it was found that they do not play an active role during the synthesis. With alkynes bearing oxidizing groups such as $—NO_2$ and acid groups such as —COOH, however, the reaction sometimes gives only a rather low yield. Thus, groups neutral to the synthesis, such as neutral non-oxidizing groups, are preferred.

Suitable metal carbonyls include the pure carbonyls of the transition metals of the sixth, seventh, and eighth groups of the periodic table as well as the derivatives thereof wherein one or more carbonyl groups are substituted by radicals such as nitrosyl, substituted iso-nitrile, substituted phosphines, substituted arsines, substituted stibines, and halogen atoms. As examples of the pure carbonyls, iron pentacarbonyl, iron enneacarbonyl, iron tetracarbonyl, di(manganese pentacarbonyl), nickel tetracarbonyl, tungsten hexacarbonyl, molybdenum hexacarbonyl, dicobalt octacarbonyl, and tetracobalt decacarbonyl may be mentioned. If substituted carbonyls are employed, the final complexes will obviously contain the corresponding substituents.

The neutral non-aqueous medium may consist of a suitable solvent or one of the reactants itself if it is a liquid. Suitable solvents include aromatic and paraffinic hydrocarbons, ethers, ketones, and similar materials. It is clear that the choice of solvent within the definition is dependent upon the temperature range at which the reaction is conducted and the respective solubilities of the reactants and the products. In a few instances, the reaction can be performed without a solvent when the acetylenic compound is a liquid at reaction temperatures. Phenylacetylene is an example of such a compound. The term "neutral" as used herein means unreactive to the reactants and/or the products. Water, mineral acids, and bases are good examples of reactive mediums since the metal carbonyls will frequently react with such environments to form ionic groups. If this occurs, the complexes of the invention will not be produced.

The temperature of the reaction may be between room temperature and about 300° C., but the preferred reaction temperature lies between about 50° C. and about 150° C. to obtain a high yield and also promote a rapid rate of reaction. The preferred reaction temperature within a range will, of course, depend upon the other reaction conditions such as nature and amount of reactants, presence of solvent, pressure, and the nature of the reaction products. Moreover, a temperature within a range should obviously be chosen so as to avoid substantial side reactions resulting in a material decrease in yield. For example, 0.2 gram of iron tetracarbonyl will react with 5 grams of diphenylacetylene at about 90° C. to yield about a stoichiometeric amount of organo-metallocarbonyl complexes, but the same reactants at 260° C. will produce in yield of 70 percent and higher hexaphenylbenzene with only traces of the complexes.

When the reactants or products are sensitive to air, the reaction is preferably conducted in an inert atmosphere, such as nitrogen or carbon dioxide, but this is not mandatory. A pressure of carbon monoxide up to about 400 atmospheres can be advantageously employed in a closed system, particularly to regulate the formation of reactive carbonyls and the formation of the products.

It will be apparent to those in the art that separation of the reaction products can be accomplished by conventional techniques such as fractional crystallization or chromatography. It will also be apparent that the metal carbonyl reactant can be produced in situ by using a finely divided metal powder and a carbon monoxide atmosphere, or a reducible metal compound, a reducing agent, and a carbon monoxide atmosphere.

The invention will be better understood by reference to the following examples:

Example I

A mixture of 2.5 gr. of iron tetracarbonyl and 3.3 ml. of phenyl acetylenein 0.75 liter of a petroleum ether having a boiling point range of 60° to 70° C. and 0.1 liter of benzene was heated at the boiling point of the system for 1¾ hours. During this time 0.4 liter of solvent was distilled off. The solution was then allowed to cool and filtered, and the product (vii), which separated out on standing, was removed from the solution.

The products contained in the solution were separated by chromatographic analysis using a column of acid $Al_2O_3$. The following crystalline constituents were obtained:

(i) *Fine orange needles.*—Melted with decomposition at 242° C. Analysis and molecular weight determination was consistent with the formula $Fe(CO)_4(C_6H_5C_2H)_5$

| Analysis | Percent | | | | Mol. weight |
|---|---|---|---|---|---|
|  | C | H | Fe | O |  |
| Calculated | 77.88 | 4.46 | 8.23 | 9.43 | 678.6 |
| Found | 77.80 | 4.45 | 8.19 | 9.83 | 660 |

Infra-red spectroscopy showed two sharp bands for the CO absorption bands at 4.96 and 5.10$\mu$ and two bands at 5.88 and 6.04$\mu$ for ketonic CO in the organic ligand. The complex was highly soluble in tetrahydrofuran and soluble in benzene, acetone and ether.

(ii) *Dark red rods.*—This product having the formula $Fe(CO)_4(C_6H_5C_2H)_3$ existed in two crystalline forms which melt with decomposition at 148–150° C. and 162–165° C. respectively. Based on the above formula the analytical results were:

| Analysis | Percent | | | | Mol. weight |
|---|---|---|---|---|---|
|  | C | H | Fe | O |  |
| Calculated | 70.90 | 3.83 | 11.78 | 13.49 | 474.3 |
| Found | 71.24 | 3.92 | 11.76 | 13.69 | 464 |

The product was highly soluble in benzene, acetone and tetrahydrofuran and slightly soluble in petroleum ether and alcohol. It has been identified as 2,4,6-triphenyltropone-iron-tricarbonyl.

I. R. Spectrum (in KBr)  $C\equiv O$: 4.85 and 5.01$\mu$
$C=:6.14\mu$ (iii) *Orange rods.*—Melted at 156–158° C. with decomposition and had the same composition as in (ii). The Debye-Scherrer diagram and the infra-red spectrum were different from (ii). ($C\equiv O$: 4.85 and 5.00$\mu$; $C=O$: 6.616$\mu$). Here as with the crystals of ii only symmetric triphenyl benzene was obtained on thermal decomposition at a temperature above about 160° C. Analysis and molecular weight determination were consistent with the formula $Fe(CO)_4(C_6H_5C_2H)_3$.

| Analysis | Percent | | | | Mol. weight |
|---|---|---|---|---|---|
|  | C | H | Fe | O |  |
| Calculated | 70.90 | 3.83 | 11.78 | 13.49 | 474.3 |
| Found | 70.79 | 3.93 | 11.82 | 13.60 | 429 |

The compound has the same solubilities as the product of (ii), and has been identified as 2,4,6,-triphenyltropone-iron-tricarbonyl. The isomerism between complexes (ii) and (iii) is due to the localization of the bonds between the $Fe(CO)_3$ group and the ring to only two conjugated double bonds.

(iv) *Orange red crystals.*—Melted at 180° C. with decomposition and sublimed in high vacuum at about 75° C. This material was extremely soluble in organic solvents. Its formula was $Fe_2(CO)_6(C_6H_5C_2H)_2$ according to the analysis:

| Analysis | Percent | | | | Mol. weight |
|---|---|---|---|---|---|
|  | C | H | Fe | O |  |
| Calculated | 54.49 | 2.50 | 23.08 | 19.83 | 484.0 |
| Found | 54.64 | 2.65 | 23.21 | 19.79 | 426 |

This is believed to have the structural formula

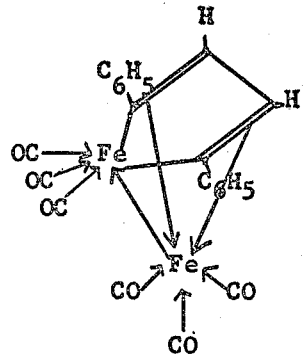

1,1,1-tricarbonyl-ferra - 2,5 - diphenylcyclopentadiene-pi-iron-tricarbonyl.

(v) *Dark red crystals.*—Melted with decomposition at about 225–235° C. and were of low solubility in the usual organic solvents. This compound had the formula $Fe(CO)_3(C_6H_5C_2H)_4$ based on the analysis:

| Analysis | Percent | | | |
|---|---|---|---|---|
|  | C | H | Fe | O |
| Calculated | 76.65 | 4.41 | 10.19 | 8.75 |
| Found | 76.57 | 4.41 | 10.44 | 9.23 |

I.R. spectrum (in KBr): $C\equiv O$: 4.96$\mu$
$C=O$: 591 and 6.13$\mu$ (vi) *Thin yellow needles.*—Melted with decomposition at 228° C. and sublimed in high vacuum above 130° C. The needles were highly soluble in benzene, acetone and tetrahydrofuran. The compound had the formula $Fe(CO)_4(C_6H_5C_2H)_2$ based on the analysis:

| Analysis | Percent | | | | Mol. weight |
|---|---|---|---|---|---|
|  | C | H | Fe | O |  |
| Calculated | 64.55 | 3.25 | 15.0 | 17.20 | 372.2 |
| Found | 64.28 | 3.04 | 14.76 | 17.26 | 370 |

This pi-complex has the structural formula

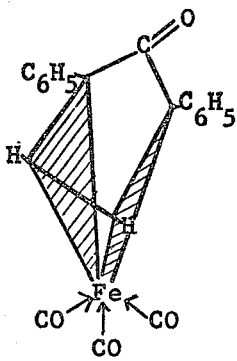

and is representative of the 2,5 - diphenyl-cyclopentadienone metal carbonyl complexes.

(vii) *Black crystals*.—The substance crystallized in the space group $P_{2_1}/n$ with the following dimensions: $a=11.963$ A, $b=20.442$ A, $c=10.326$ A, $\beta=93°24'$. It had a density of 1.54 g./cc. and was only slightly soluble in benzene, dioxane and tetrahydrofuran. It melted with decomposition at 170° C. to yield 1,3,5-triphenyl benzene. In boiling benzene the compound decomposed into the two products described in (ii) and (iii). The formula appears to be $Fe_2(CO)_6(C_6H_5C_2H)_3$ based on the analysis:

| Analysis | Percent | | | |
|---|---|---|---|---|
| | C | H | Fe | O |
| Calculated | 61.74 | 3.09 | 19.06 | 16.38 |
| Found | 61.34 | 3.13 | 18.97 | 16.43 |

The structural formula is:

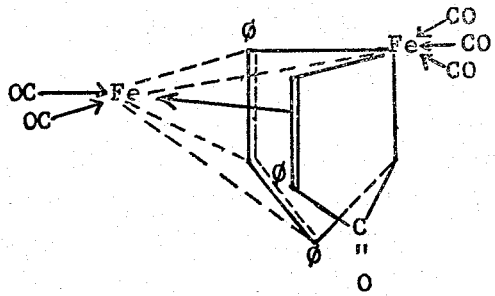

Similar reaction occurs using p-bromophenylacetylene and yields the corresponding complexes:

(ia) $Fe(CO)_4(Br\phi C_2H)_5$—M.P.: 240–206° C. with decomposition. I.R.: $C\equiv O$: 4.94 and 5.07$\mu$; $C=O$: 5.87 and 6.03$\mu$ (iia) $Fe(CO)_4(Br\phi C_2H)_3$—M.P.: 154–165° C. with decomposition. I.R.: $C\equiv O$: 4.84 and 4.98$\mu$; $C=O$: 6.18$\mu$ (iiia) $Fe(CO)_4(Br\phi C_2H)_3$—M.P.: 199–202° C. with decomposition. I.R.: $C\equiv O$: 4.86 (5.00) and 5.02$\mu$; $C=O$: 6.16$\mu$ (iva) $Fe_2(CO)_6(Br\phi C_2H)_2$—M.P.: 208–215° C. with decomposition. I.R.: $C\equiv O$: 4.82, 4.90, 4.96, 5.02 and 5.19$\mu$ (via) $Fe(CO)_4(Br\phi C_2H)_2$—two isomers: M.P.: 247–253° C. with decomposition. I.R.: $C\equiv O$: 4.81 and 4.98$\mu$; $C=O$: 6.18$\mu$. M.P.: 185–200° C. with decomposition. I.R.: $C\equiv O$: 4.82 and 498$\mu$; $C=O$: 6.08 and 6.12$\mu$ (viia) $Fe_2(CO)_6(Br\phi C_2H)_3$—M.P.: 191–212° C. with decomposition. I.R.: $C\equiv O$: 4.82, 4.88 and 4.97$\mu$

*Example II*

10.74 gr. of iron tetracarbonyl were stirred with 100 ml. of phenylacetylene and heated to 75° C. With the evolution of nearly 1 mol CO/per mol iron tetracarbonyl and the apparent formation of iron pentacarbonyl, a reaction took place which was finished after about half an hour. The excess of phenylacetylene was then distilled under vacuum and the residue dissolved in $CS_2$. The products were separated by chromatography on acid activated $Al_2O_3$. The separated products were the same as those described in Example I under (i)–(vi) with the fine orange needles having the formula $$Fe(CO)_4(C_6H_5C_2H)_5$$

in predominant yield.

*Example III*

25 gr. of iron tetracarbonyl and 25 gr. of diphenylacetylene in 4 liters of a petrol ether having a boiling point range of 80–90° C. were heated at the boiling point of the solution for 1.5 hours. During this time 1.2 liters of solvent were distilled off. The solution was then allowed to cool and was filtered. The reaction product (A) was separated by chromatography using a column of neutral $Al_2O_3$.

The experiment was repeated using only 2.8 liters of solvent with a reflux condenser, and the reaction products (B) were separated again by chromatography.

After recovery of about 10 grams of diphenylacetylene in each case the following crystalline constituents were obtained:

| Constituents | Yields, g. | |
|---|---|---|
| | (A) | (B) |
| (i) $Fe_2(CO)_6(C_6H_5C_2C_6H_5)$ | 1.15 | 1.20 |
| (ii) $Fe_2(CO)_6(C_6H_5C_2C_6H_5)_2$ | 8.44 | 8.40 |
| (iii) $Fe_3(CO)_8(C_6H_5C_2C_6H_5)_2$ | 8.89 | 5.51 |
| (iv) $Fe_2(CO)_7(C_6H_5C_2C_6H_5)_2$ | 3.48 | 3.51 |
| (v) $Fe(CO)_4(C_6H_5C_2C_6H_5)_2$ | 3.48 | 3.51 |

The above crystalline constituents had the following properties:

(i) $Fe_2(CO)_6(C_6H_5C_2C_6H_5)$.—Orange red triclinic crystals of the space group $P_1$ or $P_{\bar{1}}$ with the following cell dimensions: $a=7.15$ A., $b=8.68$ A., $c=15.87$ A., $\alpha=73°$, $\beta=76°$ and $\gamma=80°$. Their density was 1.67 g./cm. The compound was highly soluble in non-polar organic solvents and melted sharply at 146° C. For the formula above, analysis showed:

| Analysis | Percent | | |
|---|---|---|---|
| | C | H | Fe |
| Calculated | 52.45 | 2.20 | 24.39 |
| Found | 52.51 | 2.22 | 24.14 |
| | 52.44 | 2.44 | 24.42 |

(ii) $Fe_2(CO)_6(C_6H_5C_2C_6H_5)_2$.—Orange yellow crystals having the space group $P_{2_1}$ or $P_{2_1}/m$ with the following cell dimensions $a=11.38$ A., $b=7.92$ A., $c=16.73$ A. and $\beta=98°$. Their density was 1.44 g./cm. The product melted with decomposition at about 200° C. and sublimed above 130° C. in high vacuum. The compound was highly soluble in organic solvents. For the formula above, analysis showed:

| Analysis | Percent | | | | Mol. weight |
|---|---|---|---|---|---|
| | C | H | Fe | O | |
| Calculated | 64.19 | 3.17 | 17.56 | 15.08 | 636.2 |
| Found | 64.05 | 3.15 | 17.53 | 15.22 | 634 |

The product is of the same structural type as that of Example I (iv).

(iii) $Fe_3(CO)_8(C_6H_5C_2C_6H_5)_2$ is a black compound crystallizing in the space group $P_{2_1}/c$ with the following cell dimensions: $a=9.46$ A., $b=18.45$ A., $c=18.40$ A., and $\beta=98°$. The density was 1.57 g./cm. The compound melted under decomposition at about 210° C. and was moderately soluble in organic solvents. For the formula above, analysis showed:

| Analysis | Percent | | | |
|---|---|---|---|---|
| | C | H | Fe | O |
| Calculated | 57.80 | 2.70 | 22.40 | 17.11 |
| Found | 57.84 | 2.78 | 22.56 | 17.04 |

The structural formula is:

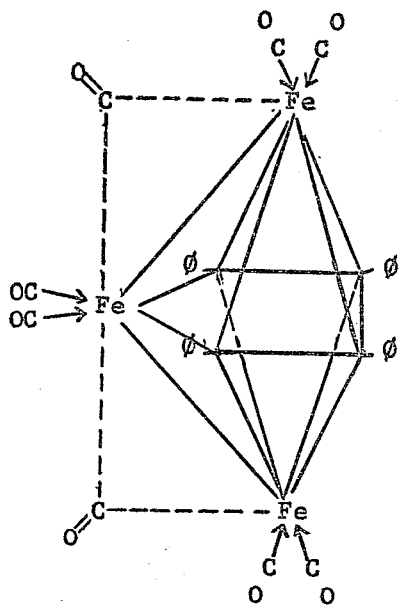

(iv) $Fe_2(CO)_7(C_6H_5C_2C_6H_5)_2$. — Dark red crystals. It is believed that the structure of this compound is 1,1,1-tricarbonyl-ferra-tetraphenylhexa - 2,5 - dien-4-one-pi-iron-tricarbonyl, for inboiling benzene the complex is slowly decomposed into complex (v) below. The structure follows:

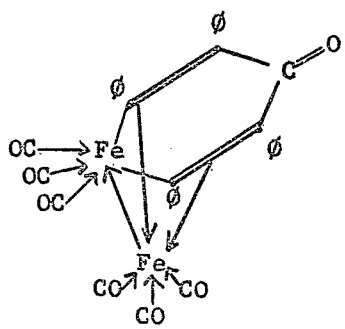

This is representative of a pi-complex of a substituted 1-ferra-hexadienone system with a $Fe(CO)_3$ group. The substance crystallized in the space group $P2_1/n$ with the cell dimensions: $a=13.20$ A., $b=11.51$ A., $c=21.62$ A. and $\beta=95°$. The density was 1.43 g./cc. The compound melted with decomposition at about 160° C. and was soluble in organic solvents. For the formula above, analysis showed:

| Analysis | Percent | | | |
|---|---|---|---|---|
| | C | H | Fe | O |
| Calculated | 63.29 | 3.03 | 16.82 | 16.86 |
| Found | 63.26 | 3.06 | 16.96 | 17.11 |

(v) $Fe(CO)_4(C_6H_5C_2C_6H_5)_2$.—Triclinic yellow crystals of the space group $P_1$ or $P_1^-$. The cell dimensions were: $a=9.82$ A., $b=10.41$ A., $c=14.94$ A., $\alpha=86°$, $\beta=86°$ and $\gamma=64°$. The density was 1.35 g./cc. The compound melted under decomposition at about 177°–180° C. to form tetraphenylcyclopentadienone. From this decomposition and infrared investigations, it appears that this compound is a pi-complex formed by the $Fe(CO)_3$ group and tetraphenylcyclopentadienone. It is of the same structural type as Example I (vi). The complex was soluble in the usual organic solvents. For the formula described above, the analysis showed:

| Analysis | Percent | | |
|---|---|---|---|
| | C | H | Fe |
| Calculated | 73.29 | 3.85 | 10.65 |
| Found | 73.19 | 4.00 | 10.63 |

In accordance with the procedures of Example III, similar reactions were also performed with iron tetracarbonyl and the following alkynes:

| Reactant | Products obtained | | | |
|---|---|---|---|---|
| | $Fe_2(CO)_6(R'C_2R'')_2$ | $Fe_2(CO)_7(R'C_2R'')_2$ | $Fe(CO)_4(R'C_2R'')_2$ | $Fe_3(CO)_8(R'C_2R'')_2$ |
| Alkyne: | | | | |
| $Cl\phi-C\equiv C-\phi Cl$ | M.P. 185–188° with decomposition. | M.P. 200–220° with decomposition. | M.P. 175–185° with de-decomposition. | M.P. 215–220° with decomposition. |
| $CH_3-C\equiv C-CH_3$ | M.P. 110–125° decomposed at 160–175°. | Decomposed at 150–170°. | | |
| $\phi-C\equiv C-CH_3$ | Two isomers M.P. 122° and 157–158° C. | Three isomers M.P. 160, 170 and 180° C. with decomposition. | M.P. 205–206° C. with decomposition. | M.P. 195–201° C. with decomposition. |
| $C_2H_5-C\equiv C-C_2H_5$ | M.P. 160–175° with decomposition. | M.P. 155–175° with decomposition. | | |
| $\phi-C\equiv C-Si-(CH_3)_3$ | Decomposed at 146–148°. | Decomposed at 167°. | M.P. 174° C. | Decomposed at 208°. |
| $\phi-C\equiv C-COOCH_3$ | M.P. 114–122° with decomposition. | M.P. 170–180° with decomposition. | | |
| $CH_3OOC-C\equiv C-COOCH_3$ | M.P. 112°. | Decomposed at 133–135° C | | |

Example IV

A mixture of 3.64 gr. of iron enneacarbonyl and 2.5 gr. bis(p-chlorophenyl)acetylene in 200 ml. of benzene was stirred and slowly heated to 70° C. The reaction resulted in the evolution of 1 mol of $Fe(CO)_5$ for each mol of $Fe_2(CO)_9$ and was finished in 5 to 10 minutes at 70° C. The reaction products of the filtered solution were separated by chromatography. The following compounds were obtained:

(i) $Fe_2(CO)_6(ClC_6H_4C_2C_6H_4Cl)_2$.—Yellow crystals of two different forms which have a melting point with decomposition at about 130° C. and about 185° C., respectively. Both forms have the same infra-red absorption, but different Debye-Scherrer diagrams. The products were highly soluble in the usual organic solvents. For the formula above, analysis showed:

| Analysis | Percent | | | |
|---|---|---|---|---|
| | C | H | Fe | Cl |
| Calculated | 52.76 | 2.08 | 14.43 | 18.32 |
| Found | 52.51 | 2.40 | 14.65 | 18.14 |

The compound is therefore of the same type as described in Example III (ii).

(ii) $Fe_2(CO)_7(ClC_6H_4C_2C_6H_4Cl)_2$.—Deep red triclinic crystals which melt at about 220° C. with decomposition. In boiling benzene, it decomposes into the violet colored M.P. 147-152° C. with decomposition (yield about 55%) and $Fe_2(CO)_6(C_6H_5C_2C_6H_5, C_2H_5C_2C_2H_5)$, M.P. 141–142.5° C. (yield about 25%) corresponding to:

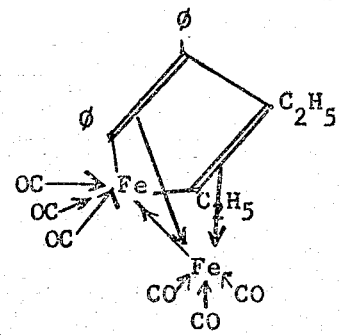

tetra-(p-chlorophenyl)cyclopentadienone and the corresponding pi-complex described in Example III (v). Such indicates that this complex is of the same type as described in Example III (iv). The compound was highly soluble in benzene and other organic solvents. For the formula above, the analysis showed:

| Analysis | Percent | | | | |
|---|---|---|---|---|---|
| | C | H | Fe | Cl | O |
| Calculated | 52.41 | 2.02 | 13.93 | 17.68 | 13.96 |
| Found | 52.55 | 2.11 | 13.89 | 17.74 | 14.14 |

The same reaction also took place with diphenylacetylene yielding the corresponding complexes. It is interesting to note that diphenylacetylene also reacted at room temperature with $Fe_2(CO)_9$ when the reaction was performed over a period of several hours in a CO atmosphere, yielding a green crystalline substitution-type complex of formula $Fe_2(CO)_7(C_6H_5C_2C_6H_5)$, which decomposed at about 70° C.

| Analysis | Percent | | | |
|---|---|---|---|---|
| | C | H | O | Fe |
| Calculated | 51.90 | 2.07 | 23.05 | 22.98 |
| Found | 52.45 | 2.32 | 22.84 | 23.34 |

This complex reacted at room temperature readily with an additional amount of diphenylacetylene yielding the two complexes $Fe_2(CO)_7(C_6H_5C_2C_6H_5)_2$ and $$Fe_2(CO)_6(C_6H_5C_2C_6H_5)_2$$

described above as well as a small amount (about 7%) of the complex $Fe(CO)_5(C_6H_5C_2C_6H_5)_2$ corresponding to tetraphenyl-p-quinone-iron-tricarbonyl (decomposed at about 300° C. with formation of tetraphenyl-p-quinone).

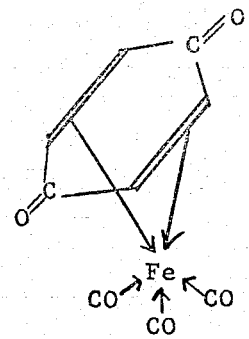

Similary, the substitution-type complex
$$Fe_2(CO)_7(C_6H_5C_2C_6H_5)$$
reacted at room temperature with diethylacetylene yielding the complexes $Fe_2(CO)_7(C_6H_5C_2C_6H_5, C_2H_5C_2C_2H_5)$, In a similar fashion, at room temperature the substitution-type complex $Fe_2(CO)_7[(CH_3)_3CC_2C(CH_3)_3]$ (decomposition at about 70° C.) was prepared by reacting $Fe_2(CO)_9$ with di(t-butyl)-acetylene. Further reaction of this latter complex with diethylacetylene yielded the complex $Fe_2(CO)_7[(CH_3)_3CC_2C(CH_3)_3, C_2H_5C_2C_2H_5]$ (decomposition at 127–130° C.) yield about 23% corresponding to

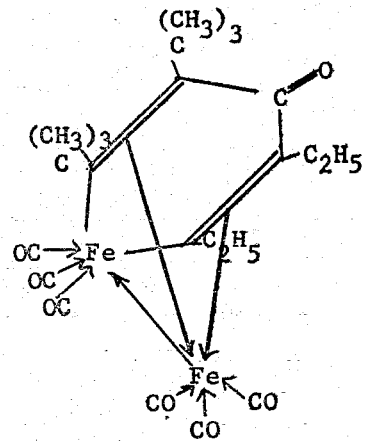

and about 16% of tetraethylquinone.

The complexes $Fe_2(CO)_6[C_6H_5C_2Si(CH_3)_3]_2$ (M.P. 146–148° C. with decomposition), $$Fe_2(CO)_7[C_6H_5C_2Si(CH_3)_3]_2$$

(decomposes at about 167° C.), and $$Fe(CO)_4[C_6H_5C_2Si(CH_3)_3]_2$$

(M.P. 174° C.) have been prepared either by direct reaction at 90° C. of $Fe_2(CO)_9$ with an excess of $$C_6H_5—C≡C—Si(CH_3)_3$$

or at room temperature by further reaction of the substitution complex $Fe_2(CO)_7[C_6H_5C_2Si(CH_3)_3]$ with an additional amount of $C_6H_5—C≡C—Si(CH_3)_3$.

*Example V*

(i) 1.5 mol of iron pentacarbonyl and 4.46 gr. of diphenyl acetylene (mol ratio 1:2.2) in 10 ml. of petroleum ether of a 90–100° C. boiling range were heated in a sealed glass tube about 4 hours at 160° C. After cooling, the crystallized reaction products were fully dissolved in 2 liters of petroleum ether, and the products were separated by chromatography. Besides about 1.3 gr. of non-reacted diphenylacetylene, there were obtained 2 gr. of the yellow complex:

$Fe_2(CO)_6(C_6H_5C_2C_6H_5)_2$ (described in Example III (ii)) and 2.8 gr. of the yellow pi-complex $$Fe(CO)_4(C_6H_5C_2C_6H_5)_2$$

(described in Example III (v)). The reaction under these conditions was quantitative in yield. The same reaction was carried out at several temperatures between 130° and 240° C. At 130° C. the reaction was not quantitative in yield and a small amount of the red complex described in Example III (iv) was obtained. At the reaction temperature of 240° C. the yield of the compound Fe(CO)₄(C₆H₅C₂C₆H₅)₂ was increased without production of any of the complex $$Fe_2(CO)_6(C_6H_5C_2C_6H_5)_2$$

Instead, a light yellow complex of the formula $$Fe(CO)_3(C_6H_5C_2C_6H_5)_2$$

was formed which upon analysis showed:

| Analysis | Percent | | | |
|---|---|---|---|---|
| | C | H | Fe | Mol. weight |
| Calculated | 75.01 | 4.07 | 11.24 | 496 |
| Found | 75.41 | 4.07 | 11.31 | 516 |
| | 75.36 | 4.03 | 10.91 | 463 |

This complex had a sharp melting point at 233° C. and was highly soluble in benzene, dioxane and acetone and slightly soluble in petroleum ether. This compound sublimed without decomposition at 180° C. in high vacuum. It appears that this compound is a pi-complex of tetraphenylcyclobutadiene and Fe(CO)₃.

(ii) Iron pentacarbonyl reacted with diphenylacetylene (90°–100° C.) in a boiling solution of petroleum ether with small amounts of pyridine present. There were only very small yields of Fe₂(CO)₆(C₆H₅C₂C₆H₅)₂ (described in Example III (ii)), $$Fe_2(CO)_7(C_6H_5C_2C_6H_5)_2$$

(described in Example III (iv)), and $$Fe(CO)_4(C_6H_5C_2C_6H_5)_2$$

(described in Example III (v)). A similar reaction occurs with bis(p-chlorophenyl)acetylene yielding the complexes Fe₂(CO)₆(ClφC₂φCl)₂ (M.P. 185–188° C. with decomposition and Fe(CO)₄(ClφC₂φCl)₂ (M.P. 175–185° C. with decomposition).

*Example VI*

1 gr. of a highly reactive iron powder was mixed with 2 gr. of diphenyl acetylene and 6 ml. of decalin, and then heated in an autoclave for 4 hours at 300° C. in the presence of about 400 atmospheres of carbon monoxide (reaction pressure). 0.3 gr. of iron and 1.1 gr. of diphenylacetylene along with carbon monoxide reacted to form the product Fe(CO)₃(C₆H₅C₂C₆H₅)₂ (described in Example V (i) and Fe(CO)₄(C₆H₅C₂C₆H₅)₂ (described in Example III (v)).

*Example VII*

2 ml. of the dimethyl ester of acetylene dicarboxylic acid were dissolved in 200 ml. petroleum ether (boiling range 90°–100° C.) and heated to 70°–80° C. Then 2 gr. of iron enneacarbonyl were added and the mixture shaken for one minute. The mixture was immediately filtered while hot and the solution allowed to cool in an inert atmosphere for thirty minutes to precipitate a light yellow crystalline product of the formula $$Fe(CO)_3(CH_3OOCC_2COOCH_3)_3$$

which includes a tropone ring.

| Analysis | Percent | | |
|---|---|---|---|
| | C | H | Fe |
| Calculated | 44.56 | 3.20 | 9.85 |
| Found | 44.47 | 3.21 | 9.81 |

This complex (yellow needles) melts at about 106° C. with decomposition to the hexamethyl ester of mellitic acid. The complex is highly soluble in benzene and ether and slightly soluble in cold petroleum ether.

*Example VIII*

5 gr. of tungsten hexacarbonyl, 6.5 gr. of diphenylacetylene, and 30 ml. petrolether (boiling range 90°–100° C.) were heated in a sealed glass tube for 4 hours at 200° C. The reaction products were dissolved in benzene and filtered and then separated by chromatography. The following tungsten carbonyl organic compounds were isolated:

(i) *Dark green crystalline powder* which was highly soluble in benzene, ether, dioxan and slightly soluble in petroleum ether and methanol. The compound melted with decomposition at about 140° C. In the infra-red spectrum there are 3 absorption bands for the stretching frequency of carbonyl groups bonded directly to the tungsten at 517μ, 5.34μ, and 5.79μ.

(ii) *Red brown crystalline powder* which was highly soluble in benzene, ether, acetone, CCl₄ and other solvents with slight solubility in alcohols. The decomposition temperature of this compound was about 162° C. Infra-red spectroscopy gave two sharp absorption bands for the stretching frequency of carbonyl groups bonded directly to the tungsten at 5.11μ and 5.32μ.

(iii) *Dark green crystalline powder* of high solubility in methanol but insoluble in benzene, ether and acetone. The compound had limited stability at ordinary conditions and decomposed rapidly at about 140° C. In the infra-red spectrum there were two bands for the stretching frequency of carbonyl groups bonded directly to the tungsten at 5.07μ and 5.19μ.

*Example IX*

2 gr. (0.0053 mol) of manganese carbonyl $$(Mn(CO)_5)_2$$

were dissolved in 5.8 gr. (0.06 mol) of phenylacetylene (C₆H₅C₂H), and the mixture was heated over an oil bath in a carbon dioxide atmosphere. Reaction took place at 120° C. with carbon monoxide evolution, and the reacting mixture turned a dark brown color. The evolution of carbon monoxide almost ceased after one hour and a half, during which period the total quantity of CO evolved was approximately 0.007 mol. After elimination of the excess of phenylacetylene by distillation in vacuum, the reaction product was dissolved in carbon disulphide and passed through a chromatographic column containing activated Al₂O₃. Besides a small quantity of non-reacted (Mn(CO)₅)₂, the following manganese-carbonyl-organo-complexes were isolated:

(i) *Colourless crystalline plates.*—Melted at 242° C., without decomposition. This compound was easily soluble in organic solvents such as benzene, acetone and could be crystallized out by adding methanol to such a solution. By infrared spectroscopy, the compound showed three typical absorption bands for the stretching frequency of carbonyl groups bonded directly to the manganese at 4.94μ, 5.14μ and 5.22μ.

(ii) *Yellow crystals.*—Melted at 160° C. without decomposition. This compound was easily soluble in solvents such as ether and benzene but was less soluble in methanol or ethanol. By infrared spectroscopy, the compound showed two sharp absorption bands for the stretching frequency of carbonyl groups bonded directly to the manganese at 4.94μ and at 5.16μ.

(iii) *Light yellow crystals.*—Melted with decomposition at approximately 185° C. It was easily soluble in solvents such as ether, benzene and acetone and was less soluble in alcohols. By infrared spectroscopy, the compound showed four sharp absorption bands for the stretching frequency of carbon groups bonded directly to the manganese at 4.90μ, 4.94μ, 5.06μ and 5.16μ.

(iv) *Yellow crystals.*—Melted with decomposition at about 103° C. Infrared spectroscopy showed two sharp absorption bands for the stretching frequency of carbonyl groups bonded directly to the manganese at 4.94μ and 5.15μ.

Similar reactions occur between manganese carbonyls and tolane or other acetylenic derivatives when dissolved in decaline, for instance, and heated at 170° C. The substituents on the acetylenic group do not hinder the formation of these novel manganese complexes.

*Example X*

1 gr. of chloro-ethynyl-benzene ($C_6H_5C_2Cl$) and 1.23 gr. of $Fe_3(CO)_{12}$ were refluxed in 30 ml. of petroleum ether(B.P. 89° C.) for about 15 minutes. The reaction mixture was filtered, and the solution was then passed over a chromatographic column filled with $Al_2O_3$. The main product obtained by the separation consisted of a yellow complex, the infrared spectrum of which showed a total of four sharp bands at 4.80, 4.88, 4.96 and 5.11$\mu$. It was identified as $Fe_2(CO)_6(C_6H_5C_2Cl)_2$ which has the same ferra-cyclopentadiene skeleton as shown in Example I (iv).

*Example XI*

2.6 ml. $Ni(CO)_4$ (0.02 mol) and 1.78 gr. of tolane (0.01 mol) were heated in a sealed tube in 5 ml. of petroleum ether (B.P. 90–100° C.) for about 15 hours at about 110° C. After cooling, the precipitate crystalline reaction product was filtered, dissolved in benzene, and purified by passing over a chromatographic column. After recrystallization in ethyl acetate, 1 gr. of dark red brown crystals which melt with decomposition at about 260° C. was obtained.

Analysis of this product showed that it corresponds to the formula $Ni(CO)_2(C_6H_5C_2C_6H_5)_4$.

| Analysis | Percent | | | |
|---|---|---|---|---|
| | C | H | Ni | O |
| Calculated | 84.17 | 4.87 | 7.09 | 3.87 |
| Found | 83.82 | 4.76 | 7.25 | 4.27 |

This complex dissolved easily in chloroform, was less soluble in benzene, acetone and ethyl acetate, and was practically insoluble in petroleum ether.

Since infrared spectroscopy has shown that there is no stretching frequency band corresponding to a CO ligand bound to a metal atom, it is believed that the structure of this complex consists of two tetraphenylcyclopentadienone rings pi-bonded to the central nickel atom.

*Example XII*

19.8 gr. $Mo(CO)_6$ (0.075 mol) and 17.8 gr. of tolane (0.1 mol) were placed in an 0.5 liter autoclave with 150 ml. of benzene, and were heated for about 14 hours at about 160° C. In such conditions, the reaction of the tolane was complete. After cooling, the reaction mixture was filtered to eliminate the unreacted molybdenum carbonyl (15 gr.), and the green solution was separated by chromatography into the following organo-molybdenum-carbonyl complexes:

(a) Yellow crystals which melt with decomposition at about 260° C. The crystals can be recrystallized in either carbon tetrachloride or a mixture of benzene and petroleum ether. Infrared investigation shows three sharp absorption bands of carbonyl ligands bound to a metal atom at 4.99, 5.11 and 5.16$\mu$. Analysis showed that the compound corresponds to the formula $$Mo(CO)_2(C_6H_5C_2C_6H_5)_4$$

| Analysis | Percent | | | |
|---|---|---|---|---|
| | C | H | O | Mo |
| Calculated | 80.54 | 4.66 | 3.70 | 11.10 |
| Found | 80.81 | 4.83 | 3.66 | 10.95 |

(b) Dark green needles which melt with decomposition at about 200° C. The complex was easily soluble in benzene and carbon tetrachloride, but practically insoluble in petroleum ether. Infra-red investigation showed two sharp absorption bands with the stretching frequency of carbonyl groups bound to the metal atom at 5.04 and 5.14$\mu$.

Analysis of this compound showed that it corresponds to the formula $Mo_2(CO)_4(C_6H_5C_2C_6H_5)_5$:

| Analysis | Percent | | | |
|---|---|---|---|---|
| | C | H | O | Mo |
| Calculated | 74.37 | 4.22 | 5.35 | 16.06 |
| Found | 74.72 | 4.34 | 5.33 | 16.19 |

(c) Yellow needles which melt with decomposition at about 240° C. The compound can be recrystallized from benzene-petroleum ether. Infra-red investigation showed two sharp bands corresponding to the stretching frequency of carbonyl ligands attached to metal atom at 4.99 and 5.13$\mu$.

Analysis showed that it corresponds to the formula $Mo(CO)_3(C_6H_5C_2C_6H_5)_4$.

| Analysis | Percent | | | |
|---|---|---|---|---|
| | C | H | O | Mo |
| Calculated | 79.37 | 4.52 | 5.37 | 10.74 |
| Found | 79.81 | 4.45 | 5.39 | 10.80 |

*Example XIII*

3.2 gr. of phenyl propiolic acid and 2.5 gr. of iron tetracarbonyl dissolved in a mixture of 500 ml. of petroleum ether (B.P. 80–90° C.) and 100 ml. of benzene were maintained under reflux for about 2 hours. During the reaction, a red precipitate was formed which was filtered off. The red solution gave on standing for several days well defined rhombic red crystals having a melting point with decomposition at about 120° C. Infra-red investigation showed three strong absorption bands at 4.80, 4.87 and 4.95$\mu$, corresponding to the stretching frequencies of terminal carbonyl ligands, and bands at 5.84 and 6.19$\mu$. The latter may be attributed to the absorption of the CO-groups of the organic ligand.

The red precipitate can be purified by further treatment with acetic acid and water and extraction with chloroform.

It is believed that this compound corresponds to the formula $Fe_2(CO)_7(C_6H_5C_2COOH)_2$ as indicated by the analysis for iron. Calculated: 18.62. Found: 18.50. This compound has a ferra-cyclohexadienone skeleton as shown in Example III (iv).

*Example XIV*

A mixture of 0.025 mol $Fe_2(CO)_9$ (8.9 gr.) and 0.074 mol $(CH_3)_3SiC \equiv CH$ (7.2 gr.) was dissolved in 100 ml. toluene, and then held at a temperature of about 90° C. for 15 minutes. The partially crystalline residue obtained after evaporation of the solvent was passed over a chromatographic column giving a yellow substance. This compound crystallized out of an ether-petroleum ether mixture forming long needles having a melting point of 167°–168° C. The product corresponds to the formula $Fe(CO)_4(CH_3)_3SiC_2H)_2$, as shown by the following analysis:

| Analysis | Percent | |
|---|---|---|
| | C | H |
| Calculated | 46.76 | 5.54 |
| Found | 45.84 | 5.13 |

This compound is a pi-complex having cyclopentadienone ring in its structure.

Example XV 15 gr. of iron enneacarbonyl and 10 gr. of phenylmethylacetylene dissolved in 200 cc. of isooctane were heated at 50° C. for 30 minutes. Three complexes were isolated by chromatography:

(i) $Fe_2(CO)_6(C_6H_5C_2CH_3)_2$, M.P. 122° C. corresponding to 1,1,1-tricarbonyl-ferra-2,5-dimethyl-3,4-diphenyl-cyclopentadiene-pi-iron-tricarbonyl.

(ii) Two red isomers of formula $$Fe_2(CO)_7(C_6H_5C_2CH_3)_2$$

M.P. 164° C. and M.P. 178–179° C., both with decomposition corresponding to the structure previously described (Example III (iv)).

Example XVI 4 gr. of iron enneacarbonyl and 5.5 gr. of methyl phenylpropiolate dissolved in 150 cc. of benzene were heated at 25° C. for 15 hours. By chromatography, red-brown bipyramidal crystals (0.25 gr.) of the formula $Fe(CO)_3(C_6H_5C_2COOCH_3)_3$ (M.P. 170–173° C. with decomposition) were isolated. It is assumed that this complex includes a tropone ring in its structure similar to that of Example VII.

Example XVII 4.86 gr. of iron pentacarbonyl and 8.7 gr. of trimethylsilylphenylacetylene dissolved in ligroin were heated in a sealed tube at 180–200° C. for a period of 3 hours. Besides small amounts of the complex $$Fe_2(CO)_6[C_6H_5C_2Si(CH_3)_3]_2$$

0.38 gr. of the complex $Fe(CO)_4[C_6H_5C_2Si(CH_3)_3]$ was obtained, both of which were identical to those shown in the table in Example III.

Example XVIII 6.85 gr. of iron enneacarbonyl and 7.6 gr. of diphenylbutadiene dissolved in 100 ml. of petroleum ether (B.P. 50° C.) were refluxed for one hour. Three complexes were isolated by chromatography:

(i) Yellow prisms (M.P. 180–182° C. with decomposition) corresponding to $Fe_2(CO)_6(C_6H_5C_2C\equiv CC_6H_5)_2$ (yield: 6%).

| Analysis | Percent | | | |
|---|---|---|---|---|
| | C | H | O | Fe |
| Calculated | 66.69 | 2.94 | 14.03 | 16.34 |
| Found | 66.58 | 2.96 | 14.04 | 16.17 |

(ii) Red prisms (decomposition at 185–195° C.) corresponding to $Fe_2(CO)_7(C_6H_5C_2C\equiv CC_6H_5)_2$ (yield: 11%).

| Analysis | Percent | | | |
|---|---|---|---|---|
| | C | H | O | Fe |
| Calculated | 65.76 | 2.83 | 15.72 | 15.69 |
| Found | 65.36 | 2.92 | 15.89 | 15.76 |

(iii) Small amounts of yellow prisms (M.P. 170–175° C. with decomposition) corresponding to $$Fe(CO)_4(C_6H_5C_2C\equiv CC_6H_5)_2$$

including a cyclopentadienone ring.

| Analysis | Percent | | | |
|---|---|---|---|---|
| | C | H | O | Fe |
| Calculated | 75.54 | 3.52 | 11.18 | 9.76 |
| Found | 75.73 | 3.55 | 11.10 | 9.66 |

Example XIX (a) 6 gr. of iron pentacarbonyl and 4.2 gr. of di-(t-butyl)acetylene dissolved in 100 ml. of ligroin (B.P. 40–60° C.) where irradiated at room temperature with U.V. light for 16 hours. The solution was brought to dryness under a CO stream, taken over with ligroin and chromatographed over silicagel. One isolated a yellow compound which was recrystallized in petroleum ether at −70° C. under a CO stream and identified as the substitution-type complex of formula $$Fe(CO)_4[(CH_3)_3CC_2C(CH_3)_3],$$

M.P. 39–40° C. (yield: 40%).

| Analysis | Percent | | | |
|---|---|---|---|---|
| | C | H | O | Fe |
| Calculated | 54.93 | 5.93 | 20.90 | 18.24 |
| Found | 54.49 | 6.16 | 20.98 | 18.22 |

In a similar fashion, the following substitution-type complexes were also prepared:

$Fe(CO)_4[(CH_3)_3SiC_2Si(CH_3)_3]$: yellow crystals, M.P. 42–43° C.

$Fe(CO)_4[C_6H_5C_2Si(CH_3)_3]$: yellow crystals, M.P. 33–34° C.

(b) 3.4 gr. of the previous yellow substitution-type complex dissolved in 50 ml. of ligroin were reacted at room temperature with 1.8 gr. of diethylacetylene under a CO stream for four days. By chromatography, one isolated the following two complexes:

(i) $Fe_2(CO)_6(C_2H_5C_2C_2H_5)_3$, dark violet crystals, M.P. 155–160° C. with decomposition (yield: 8%), the structure of which is as yet uncertain.

(ii) $Fe_2(CO)_7(C_2H_5C_2C_2H_5)_2$, red crystals, M.P. 155–175° C. with decomposition, the structure of which is comparable to that of compound III (iv). Besides these complexes, one also got about 35% of tetraethylquinone. It is noteworthy that an exchange reaction occurs simultaneously with the ring structure formation.

(c) 4.25 gr. of the previous yellow substitution-type complex dissolved in 50 ml. of ligroin were reacted with 2.5 gr. of diphenylacetylene under a CO stream for seven days. By chromatography one isolated the following two complexes:

(iii) $Fe_2(CO)_7(C_6H_5C_2C_6H_5)_2$, red crystals (yield: 77%), identical to that obtained in Example III (iv).

(iv) $Fe_2(CO)_6(C_6H_5C_2C_6H_5)_2$, yellow crystals (yield: 7%), identical to that obtained in Example III (ii).

As in the former case, note that an exchange reaction occurs while the ring structure is formed.

Example XX (a) The substitution-type complex phenylacetylene dicobalt hexacarbonyl was prepared at room temperature, according to the procedure described by Greenfield and Sternberg (J.A.C.S. 78 (1956), p. 120), by reacting $Co_2(CO)_8$ with phenylacetylene.

(b) 4 gr. of this complex and 10 ml. of phenylacetylene were dissolved in 100 ml. of petroleum ether (B.P. 50–60° C.) and stored under nitrogen atmosphere at room temperature for several days. Besides a brown amorphous product, a dark violet crystalline compound precipitated which was then recrystallized from benzene-petroleum ether mixture yielding about 7% of the violet complex $Co_2(CO)_6(C_6H_5C_2H)_3$, which starts to decompose at about 165° C.

| Analysis | Percent | | | |
|---|---|---|---|---|
| | C | H | O | Co |
| Calculated | 60.83 | 3.06 | 16.21 | 19.90 |
| Found | 60.61 | 3.21 | 16.31 | 19.88 |

The I.R. spectrum shows bands for C≡O at 4.70, 4.97 and 5.03µ and for a C=O band at 5.97µ.

*Example XXI*

(a) The substitution-type complex (t-butyl)acetylene dicobalt hexacarbonyl was prepared at room temperature by reacting dicobalt octacarbonyl with a small excess of (t-butyl)acetylene in solution of petroleum ether. The product was purified by chromatography and isolated as a red oil.

(b) 5 gr. of this complex and 5 gr. of (t-butyl)acetylene were dissolved in 50 ml. of petroleum ether (B.P. 90–100° C.) and were heated at the boiling point of the solvent for about 2 hours. From the cooled solution, the following were isolated:

(i) Orange-red needles precipitated (decomposition at about 160° C.) identified as $Co_2(CO)_6[C(CH_3)_3C_2H]_4$, the structure of which is:

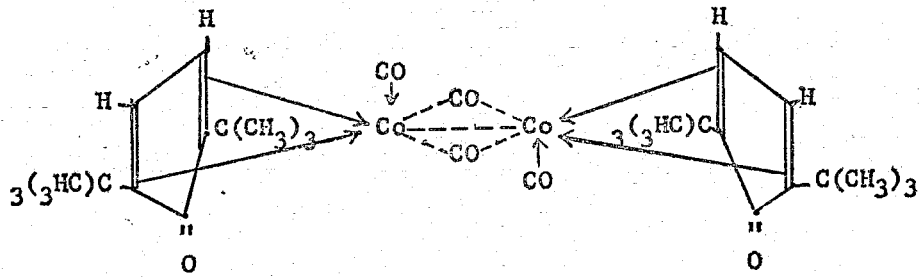

| Analysis | Percent | | | |
|---|---|---|---|---|
| | C | H | O | Co |
| Calculated | 58.63 | 6.56 | 15.63 | 19.18 |
| Found | 58.69 | 6.54 | 15.72 | 19.00 |

(ii) By chromatography of the mother-liquor, red-violet crystals (M.P. 81° C.) were obtained and were identified as $Co_2(CO)_4[C(CH_3)_3C_2H]_3$, the structure of which corresponds to:

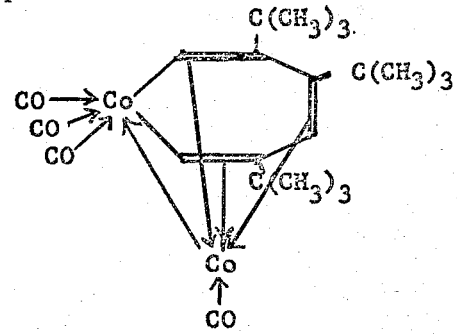

It is interesting to notice that by thermal decomposition of this compound at about 160° C. one gets the hitherto unknown 1,2,4-tri(t-butyl)benzene (M.P. 49° C.) in 56% yield.

| Analysis | Percent | | | |
|---|---|---|---|---|
| | C | H | O | Co |
| Calculated | 55.47 | 6.35 | 13.44 | 24.75 |
| Found | 55.47 | 6.13 | 13.63 | 24.97 |

In a similar fashion by using trimethylsilyl acetylene, the complex $Co_2(CO)_6[(CH_3)_3SiC_2H]_4$ was obtained as orange prisms (decomposition at about 150° C.) which has the same structure as shown in (b)(i).

When an excess of (t-butyl)acetylene and dicobalt hexacarbonyl dissolved in petroleum ether are heated together at about 90° C. for about 2 hours, one gets directly the two complexes above, the substitution-type complex being formed as an intermediate.

*Example XXII*

(a) The complex phenyl propiolic acid methylester tetracobalt decacarbonyl was prepared by reacting tetracobalt dodecacarbonyl with a stoichiometric amount of the methyl ester of phenyl propiolic acid, dissolved in 50 ml. of petroleum ether, at 55° C. for about 3 hours under nitrogen atmosphere. Dark blue crystals (decomposition at 145° C.) identified as being $$Co_4(CO)_{10}(C_6H_5C_2COOCH_3)$$

were obtained.

(b) 1 gr. of this complex and 3 gr. of the methyl ester of phenyl propiolic acid, dissolved in 50 ml. of petroleum ether (B.P. 60–70° C.) were gently refluxed for about 3 hours. A color change from blue to dark violet and a partial precipitation of a colorless organic compound, which was separated by filtration, were observed. By chromatography, a violet complex of the formula $$Co_2(CO)_4(C_6H_5C_2COOCH_3)_3$$

the structure of which includes a cobalta-heptatriene ring as in Example XXI (b) (ii), was obtained. (Decomposition at about 200° C.)

| Analysis | Percent | | | |
|---|---|---|---|---|
| | C | H | O | Co |
| Calculated | 57.47 | 3.41 | 22.53 | 16.59 |
| Found | 57.50 | 3.46 | 22.65 | 16.81 |

Decomposition of this complex led to 1,3,5-triphenyl-2,4,6-tricarbomethoxy-benzene, hence showing that the substituent position is different from that ascertained for the complex including a t-butyl substituent. It is interesting to note that the complex $$Co_2(CO)_4(CH_3OOCC_2COOCH_3)_3$$

(decomposition at 160° C.) has been prepared by reacting the substitution-type complex $Co_4(CO)_{10}(C_6H_5C_2C_6H_5)$ with an excess of the dimethyl ester of acetylene dicarboxylic acid.

The organo-metallo-carbonyl complexes of the invention are stable crystalline products at normal temperatures, usually soluble in organic solvents, and insoluble in water. Many of these products have surprisingly high melting and decomposition temperatures, that is, above 200° C. Upon thermal decomposition, some complex types give in high yields five, six, and higher numbered carbon ring compounds. Thus, a general use of the inventive products is the preparation of complicated organic ring systems as by heating $Fe_2(CO)_6(C_6H_5C_2H)_3$ or $$Fe(CO)_4(C_6H_5C_2H)_3$$

to about 170° C. to produce exclusively 1,3,5-triphenylbenzene or by heating $Fe(CO)_4(C_6H_5C_2C_6H_5)_2$ to about 200° C. to yield tetraphenylcyclopentadienone. A further example is the decomposition of $$Fe(CO)_2(CH_3OOCC_2COOCH_3)_3$$

at about 180° C. to yield the hexamethyl ester of mellitic acid.

Another use is the addition of minor amounts of the products of the invention, used separately or in mixture, to gasoline and high energy fuels to impede their thermal break-down and otherwise increase their effective power output. Particularly preferred for this application are the described manganese complexes.

A further use of the complexes is in the formation of metallic mirrors as elemental coatings or films by subjecting the particular organo-metallo-carbonyl complex to thermal decomposition in a non-oxidizing atmosphere. Such metallic coatings and films have useful properties including electrical conductance, catalytic and decorative effects, and corrosion resistance. Also, it provides a simple means of effecting an alloyed metal surface by using several types of metallic complexes.

An example of a metal deposition on glass cloth will indicate the simplicity of the coating process. A strip of glass cloth dried at 200° C. for one hour is placed in an evacuated glass tube containing $Ni(CO)_2(C_6H_5C_2C_6H_5)_4$. The tube is sealed and then heated at 400° C. for about 30 minutes. The glass cloth has an unusually adherent nickel coating. Similarly coatings of other metals can be produced by thermal decomposition of the respective organo-metallo-carbonyl complexes.

It is also apparent that a host of other uses exist for the inventive products since they are capable of providing in controlled amounts highly reactive organic radicals within the zone of reaction. For example, these reactive radicals can act as catalysts in the preparation of cyclic compounds, such as substituted benzenes from substituted acetylenes, and in the preparation of heterocyclic compounds. Other uses for the compounds of this invention are disclosed in the following copending applications filed by Karl W. Hubel and Emile H. Braye on March 31, 1960, namely, Serial Nos. 18,805; 18,840, now U.S. Patent 3,097,153; 18,808, now U.S. Patent 3,125,594; 18,889, now U.S. Patent 3,096,265; 18,890, now U.S. Patent 3,096,266; and 18,846, now U.S. Patent 3,149,138.

This application is a continuation-in-part of my copending application Serial No. 707,111, filed January 6, 1958, and now abandoned.

What is claimed is:

1. An organo-metallo-carbonyl complex having from one to two rings, each of said rings comprising between 5 and 8 ring members inclusive, and pi-bonded to each of said rings from one to two transition metals of the sixth, seventh and eighth groups of the periodic table; an even number between 4 and 6 inclusive of members of each of said rings being carbon atoms having only a single covalent bond available after ring bonds to other ring members, and at least one but not more than two members of each of said rings being selected from the class consisting of from zero to two carbonyl groups and from zero to one transition metal of the sixth, seventh, and eighth groups of the periodic table; the residual valence of each of said ring member carbon atoms being satisfied by a covalent bond with a monovalent radical, and at least one of said ring member carbon atoms being bonded to a monovalent radical other than hydrogen, said monovalent radicals containing up to 18 carbon atoms and being selected from the group consisting of hydrogen, alkyl, phenyl, halogen-substituted phenyl, halogeno, —COOZ wherein Z is selected from the group consisting of hydrogen and alkyl groups, alkenyl, alkynyl, cycloaliphatic, and hydrides and alkyl-substituted hydrides of an element selected from the group consisting of silicon, arsenic, phosphorous, and antimony; any residual valence of said metal member in each of said rings being satisfied by a bond with a group selected from the class consisting of carbonyl groups and said pi-bonded metal; each remaining residual valence of said pi-bonded metal being satisfied by a bond with a group selected from the class consisting of carbonyl groups, another pi-bonded metal, and said metal member in said ring, and said metal being the same throughout said complex.

2. The organo-metallo-carbonyl complex defined in claim 1 wherein said pi-bonded metal is iron.

3. The organo-metallo-carbonyl complex defined in claim 1 wherein said pi-bonded metal is cobalt.

4. The organo-metallo-carbonyl complex defined in claim 1 wherein said pi-bonded metal is nickel.

5. The organo-metallo-carbonyl complex defined in claim 1 wherein said pi-bonded metal is manganese.

6. The organo-metallo-carbonyl complex defined in claim 1 wherein said pi-bonded metal is molybdenum.

7. The organo-metallo-carbonyl complex defined in claim 1 wherein said pi-bonded metal is tungsten.

8. An organo-metallo-carbonyl complex having the formula $$[R]_z—M_x—(CO)_m$$

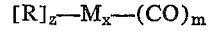

wherein M is a transition metal of the sixth, seventh, and eighth groups of the periodic table; $x$ is an integer from 1 to 2 inclusive; CO is a carbonyl group bonded to said metal M; $m$ is the number of said CO groups required to satisfy the residual valences of said metal M exclusive of pi-bonds; R is a ring pi-bonded to said metal M, which ring consists of from 5 to 8 ring members inclusive consisting of an even number between 4 and 6 inclusive of carbon atoms having only a single covalent bond available after ring bonds to other ring members, each of said ring member carbon atoms being covalently bonded to a monvalent radical and at least one of said ring carbon atoms being bonded to a monovalent radical other than hydrogen, said monovalent radicals containing up to 18 carbon atoms and being selected from the group consisting of hydrogen, alkyl, phenyl, halogen-substituted phenyl, halogeno, —COOZ wherein Z is selected from the group consisting of hydrogen and alkyl groups, alkenyl, alkynyl, cycloaliphatic, and hydrides and alkyl-substituted hydrides of an element selected from the group consisting of silicon, arsenic, phosphorus, and antimony, and at least one but not more than two ring members selected from the class consisting of from zero to two carbonyl groups and from zero to one $Y(CO)_y$ groups, wherein Y is a transition metal of the sixth, seventh, and eighth groups of the periodic table, CO is carbonyl bonded to said metal Y, and $y$ is the number of said CO groups required to satisfy the residual valences of said metal Y exclusive of ring bonds; $z$ is an integer from 1 to 2 inclusive, and said metal is the same throughout said complex.

9. The complex defined in claim 8 wherein M and Y are iron.

10. The complex defined in claim 8 wherein M and Y are cobalt.

11. The complex defined in claim 8 wherein M and Y are nickel.

12. The complex defined in claim 8 wherein M and Y are manganese.

13. The complex defined in claim 8 wherein M and Y are molybdenum.

14. The complex defined in claim 8 wherein M and Y are tungsten.

15. An organo-metallo-carbonyl complex having the formula

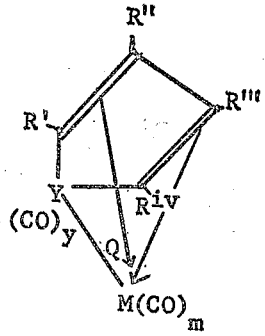

wherein M represents a transition metal of the sixth, seventh, and eighth groups of the periodic table; Y represents a group selected from the class consisting of carbonyl groups and transition metals of the sixth, seventh, and eighth groups of the periodic table, R', R", R''' and $R^{iv}$ represent monovalent radicals at least one of which is a monovalent radical other than hydrogen; said monovalent radicals containing up to 18 carbon atoms and being selected from the group consisting of hydrogen, alkyl, phenyl, halogen-substituted phenyl, halogeno, —COOZ wherein Z is selected from the group consisting of hydrogen and alkyl groups, alkenyl, alkynyl, cycloaliphatic, and hydrides and alkyl-substituted hydrides of an element selected from the group consisting of silicon, arsenic, phosphorous, and antimony; m is an integer representing the number of residual valences of M exclusive of pi-bonds and M—Y bonds; y is an integer representing the number of residual valences of Y exclusive of ring bonds and M—Y bonds; Q represents from zero to 1 coordinate bond between M and Y; and when Y is a transition metal, M and Y represent the same metal.

16. The complex defined in claim 15 wherein M is iron and Y is carbonyl.

17. The complex defined in claim 15 wherein M and Y are both iron.

18. An organo-metallo-carbonyl complex having the formula

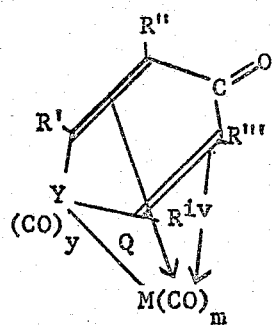

wherein M represents a transition metal of the sixth, seventh, and eighth groups of the periodic table; Y represents a group selected from the class consisting of carbonyl groups and transition metals of the sixth, seventh, and eighth groups of the periodic table; m is an integer representing the number of residual valences of M exclusive of pi-bonds and M—Y bonds; y is an integer representing the number of residual valences of Y exclusive of ring bonds and M—Y bonds; Q represents from zero to 1 coordinate bond between M and Y; R', R", R''', and $R^{iv}$ represent monovalent radicals at least one of which is a monovalent radical other than hydrogen, said monovalent radicals containing up to 18 carbon atoms and being selected from the group consisting of hydrogen, alkyl, phenyl, halogen-substituted phenyl, halogeno, —COOZ wherein Z is selected from the group consisting of hydrogen and alkyl groups, alkenyl, alkynyl, cycloaliphatic, and hydrides and alkyl-substituted hydrides of an element selected from the group consisting of silicon, arsenic, phosphorus, and antimony; and when Y is a transition metal, M and Y represent the same metal.

19. The complex defined in claim 18 wherein M and Y are iron.

20. An organo-metallo-carbonyl complex having the formula

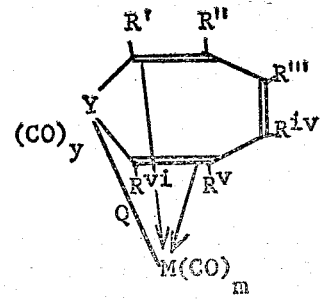

wherein M represents a transition metal of the sixth, seventh, and eighth groups of the periodic table; Y represents a group selected from the class consisting of carbonyl groups and transition metals of the sixth, seventh, and eighth groups of the periodic table; m is an integer representing the number of residual valences of M exclusive of pi-bonds and M—Y bonds; y is an integer representing the number of residual valences of Y exclusive of ring bonds and M—Y bonds; Q represents from zero to 1 coordinate bond between M and Y; R', R", R''', $R^{iv}$, $R^v$ and $R^{vi}$ represent monovalent radicals at least one of which is a monovalent radical other than hydrogen, said monovalent radicals containing up to 18 carbon atoms and being selected from the group consisting of hydrogen, alkyl, phenyl, halogen-substituted phenl, halogeno,

—COOZ wherein Z is selected from the group consisting of hydrogen and alkyl groups, alkenyl, alkynyl, cycloaliphatic, and hydrides and alkyl-substituted hydrides of an element selected from the group consisting of silicon, arsenic, phosphorus, and antimony, and when Y is a transition metal, M and Y represent the same metal.

21. The complex defined in claim 20 wherein M and Y are cobalt.

22. An organo-metallo-carbonyl complex having the formula

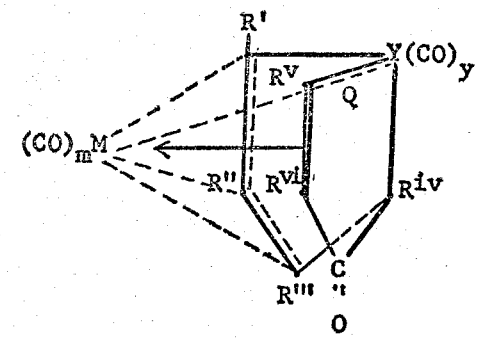

wherein M and Y are the same and represent a transition metal of the sixth, seventh, and eighth groups of the periodic table; m is an integer representing the number of residual valences of M exclusive of pi-bonds and M—Y bonds; y is an integer representing the number of residual valences of Y exclusive of ring bonds and M—Y bonds; Q represents from zero to 1 coordinate bond between M and Y; and R', R", R''', $R^{iv}$, $R^v$ and $R^{vi}$ represent monovalent radicals at least one of which is a monovalent radical other than hydrogen, said monovalent radicals containing up to 18 carbon atoms and being selected from the group consisting of hydrogen, alkyl, phenyl, halogen-substituted phenyl, halogeno, —COOZ wherein Z is selected from the group consisting of hydrogen and alkl groups, alkenyl, alkynyl, cycloaliphatic, and hydrides and alkyl-subsituted hydrides of an element selected from the group consisting of silicon, arsenic, phosphorus, and antimony.

23. The complex defined in claim 22 wherein M and Y are both iron.

24. As a compound, tetraphenylcyclopentadienone iron tricarbonyl.

25. $Fe_2(CO)_6(C_6H_5C_2H)_3$.
26. $Fe(CO)_4(C_6H_5C_2H)_3$.
27. $Fe(CO)_4(ClC_6H_4C_2C_6H_4Cl)_2$.
28. $Fe_2(CO)_7(CH_3C_2C_6H_5)_2$.
29. $Fe_2(CO)_6(C_6H_5C_2C_6H_5)_2$.

(References on following page)

References Cited by the Examiner

UNITED STATES PATENTS 2,434,578  1/48  Miller _____ 260—429
3,096,266  7/63  Hubel et al. _____ 260—429

FOREIGN PATENTS 885,514  12/61  Great Britain.

OTHER REFERENCES

Greenfield et al., J.A.C.S., vol. 78 (1956), pp. 120–124.
Leto et al., J.A.C.S., vol. 81, No. 12 (1959), p. 2970.
Sternberg et al., J.A.C.S., vol. 76 (1954), pp. 1457–1458.
Sternberg et al., J.A.C.S., vol. 78 (1956), pp. 3621–3623.

TOBIAS E. LEVOW, *Primary Examiner.*